(No Model.)

J. H. E. DE CELLES.
FRAME FOR EYEGLASSES OR SPECTACLES.

No. 506,164. Patented Oct. 3, 1893.

WITNESSES:
N. E. Paige
R. M. Russell

J. H. E. De Celles,
INVENTOR
By his attorneys
Strawbridge & Taylor

UNITED STATES PATENT OFFICE.

JOSEPH HILAIRE ERNEST DE CELLES, OF SOUTHBRIDGE, MASSACHUSETTS, ASSIGNOR TO HENRY E. KIRSTEIN, OF ROCHESTER, NEW YORK.

FRAME FOR EYEGLASSES OR SPECTACLES.

SPECIFICATION forming part of Letters Patent No. 506,164, dated October 3, 1893.

Application filed December 24, 1892. Serial No. 456,216. (No model.)

*To all whom it may concern:*

Be it known that I, JOSEPH HILAIRE ERNEST DE CELLES, a citizen of the United States, residing at Southbridge, Massachusetts, have invented certain new and useful Improvements in Eyeglass or Spectacle Frames, of which the following is a specification.

My invention relates to the bridges of eye glass and spectacle frames, and especially to that class of bridges which are made adjustable to allow of the movement of the lenses toward and from each other, and in which a spring or springs, mounted upon or in connection with the bow, constantly operate to force the lenses toward each other, so that in use the lenses, through the intervention of the nose pieces, are held against the opposite sides of the nose of the wearer with a pressure measured by the strength of the spring employed.

It is the object of my present invention to provide a bridge spring in which with compactness, strength and durability is combined exceptional smoothness of action in the sliding of one part past or upon another.

In the accompanying drawings I show and herein I describe a good form of a convenient embodiment of my invention, the particular subject-matter claimed as novel being hereinafter definitely specified.

Figure 1:
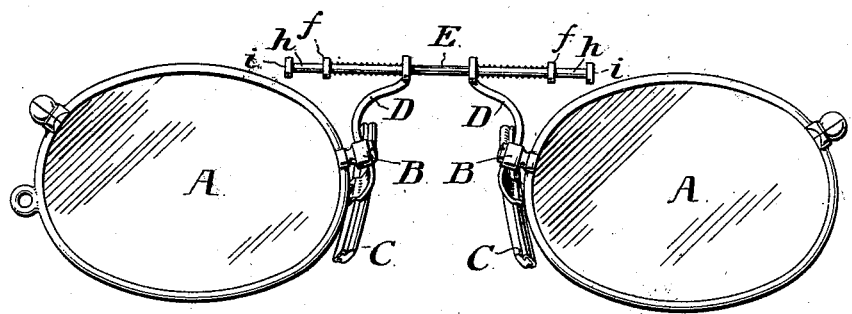
Figure 2:
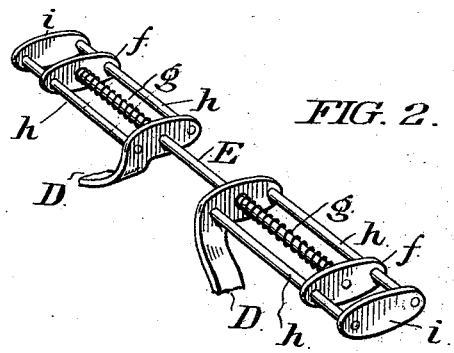

In the accompanying drawings, Figure 1 is a view in front elevation of a pair of eye glasses provided with a bridge embodying my invention, and Fig. 2 is a fragmentary view, in perspective, of the bridge spring.

Similar letters of reference indicate corresponding parts.

In the drawings, A A are the lenses, B B the clamp posts, and C C the nose pieces, of a pair of eye glasses, the parts mentioned being of any preferred construction.

D D are what I term the side bars, being, in the form shown, a pair of upright members, the lower extremities of which happen to be illustrated as respectively attached to the respective clamp posts, and the bodies of which converge toward each other from their lower to their upper extremities where, in the form shown, they meet when the glasses are closed or drawn toward each other to the limit of their movement.

E is what I term a slide pin, the length of which will be determined by the range of adjustability which it is desired that the bridge shall possess, which pin extends freely through pin openings formed in the upper extremities of the respective side bars.

*f f* are what I term yokes, one of which is shown as applied to and rigidly mounted upon each extremity of the slide pin.

*g g* are spiral springs, mounted respectively upon the respective end portions of the slide pin, and each of which springs bears with expansive thrusts against the yoke and the side bar between which it is, as shown, confined. As will be understood the thrust of the springs *g g* operates to force the respective side bars and connected lenses toward each other, until, in the construction illustrated, the upper extremities of the side bars or lens connections meet at a point at or about midway of the length of the pin E. Guide pins are provided at the respective extremities of the bridge, which pins operate both to produce smoothness of action of the sliding parts, and to maintain the side bars against rotation upon the slide pin, and as both sets of guide pins are similar, description of one will suffice for both.

*h h* are the guide pins referred to, the same being small bars shown as of circular cross section, disposed respectively on opposite sides of the slide pin, the inner ends of which guide pins are, in the form shown, rigidly connected to the adjacent side bar, and which guide pins extend, in parallelism with the slide pin E, outwardly away from said side bar, and pass through suitable guide pin holes in the adjacent yoke *f*. The yoke *f*, being rigidly mounted upon the slide pin E, and the guide pins *h* being rigidly secured to the side bar D, it will be understood that the side bar D is very firmly held against rotation upon the pin E, while smoothness of sliding movement of the side bar upon the slide pin is insured by the sliding engagement of the guide pins *h* with the yoke *f*. I prefer to mount a cap piece *i* upon the free extremities of the guide pins, to protect said ends and impart a finished appearance to the structure, and this cap, in the construction shown, also serves to limit, by its contact with the yoke $f$, the movement of the side bar with which it is connected, to prevent said side bar from traveling inward beyond the center of the slide pin.

Having thus described my invention, I claim and desire to secure by Letters Patent—

1. In combination with a pair of lenses, a bridge spring consisting of the following elements, namely: a slide pin, yokes mounted upon the respective extremities of said slide pin, each yoke having a guide pin mounted in sliding engagement with it, springs mounted upon the respective extremities of the bridge and adapted to force the lenses toward each other, and a connection between each guide pin and the adjacent lens or lens frame, substantially as set forth.

2. In combination with a pair of lenses, a bridge spring consisting of the following elements, namely: a slide pin, a pair of yokes mounted respectively upon the respective extremities of said slide pin, each yoke having a pair of guide pins mounted in sliding engagement with it, the inner extremity of each pair being connected to a device free for sliding movement upon the slide pin, a pair of springs respectively adapted to bear against the respective yokes and the said devices connected to the inner extremities of the guide pins, and means for connecting the guide pins to the respective lenses, substantially as set forth.

3. The combination, to form a bridge spring, of supports such as the side bars, a slide pin mounted in sliding engagement with both bars, yokes mounted upon the respective extremities of the slide pin, a pair of springs mounted respectively upon the respective extremities of the slide pin and bearing each against a yoke and a side bar, and guide pins mounted in connection with the side bars and yokes, substantially as set forth.

4. The combination, to form a bridge spring, of supports such as the side bars, a slide pin engaged with both bars, yokes at the respective extremities of the slide pin, springs each adapted to bear against a yoke and a side bar, and guide pins, one of which is mounted in sliding engagement with one yoke and rigidly affixed to the adjacent side bar, and the other of which is mounted in sliding engagement with the other yoke and rigidly affixed to the other side bar, substantially as set forth.

5. The combination, to form a bridge spring, of supports such as the side bars, a slide pin mounted in sliding engagement with both bars, yokes applied to the respective extremities of the slide pin, springs adapted to force said side bars toward each other, two pairs of guide pins, each pair rigidly affixed to one of the side bars and disposed in sliding engagement with the adjacent yoke, substantially as set forth.

6. The combination, to form a bridge spring, of a slide pin, yokes applied to the respective extremities of the slide pin, springs, two pairs of guide pins, each pair disposed in sliding engagement with one yoke, side bars or other connections between the guide pins and the respective lenses, and a pair of caps or similar devices applied to the ends of guide pins not engaged with the lens connection, substantially as set forth.

In testimony that I claim the foregoing as my invention I have hereunto signed my name this 9th day of December, A. D. 1892.

JOSEPH HILAIRE ERNEST DE CELLES.

In presence of—
ISAAC ST. MARTIN,
ALFRED GALIPEAN.